United States Patent
Kitashou et al.

(10) Patent No.: US 9,193,395 B2
(45) Date of Patent: Nov. 24, 2015

(54) CAB AND WORK VEHICLE

(71) Applicant: KOMATSU LTD., Tokyo (JP)

(72) Inventors: Masato Kitashou, Komatsu (JP); Makoto Yomogita, Hirakata (JP); Naoki Kimura, Komatsu (JP); Masahiko Hamaguchi, Nomi (JP); Junichi Suneya, Komatsu (JP); Takanori Yamahata, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/373,557

(22) PCT Filed: Mar. 28, 2014

(86) PCT No.: PCT/JP2014/059228
§ 371 (c)(1),
(2) Date: Jul. 21, 2014

(87) PCT Pub. No.: WO2014/181608
PCT Pub. Date: Nov. 13, 2014

(65) Prior Publication Data
US 2015/0298748 A1     Oct. 22, 2015

(51) Int. Cl.
*B62D 33/06*     (2006.01)
*E02F 9/16*     (2006.01)

(52) U.S. Cl.
CPC ........ *B62D 33/0617* (2013.01); *B62D 33/0604* (2013.01); *E02F 9/16* (2013.01)

(58) Field of Classification Search
CPC ... B62D 33/06; B62D 33/0617; B62D 33/077
USPC ......... 296/190.01, 190.04, 190.08; 180/89.12
See application file for complete search history.

(56) References Cited

U.S. PATENT DOCUMENTS 4,099,763 A * 7/1978 Maier ............... B62D 33/0604
                                        296/190.08
4,722,065 A * 1/1988 Ogawa .................... G06F 15/02
                                          708/140

(Continued)

FOREIGN PATENT DOCUMENTS

JP         5-106240 A     4/1993
JP       2008-106522 A     5/2008

(Continued)

OTHER PUBLICATIONS

The International Search Report for the corresponding international application No. PCT/JP2014/059228, issued on Jul. 1, 2014.

*Primary Examiner* — Gregory Blankenship
(74) *Attorney, Agent, or Firm* — Global IP Counselors, LLP (57) ABSTRACT

A cab body has a panel section. The panel section includes a concave section that is recessed upward. A floor frame includes a convex section and supports the cab body. The convex section has a shape that protrudes facing upward and is arranged to protrude from the concave section. A seal member seals a gap between the concave section and the convex section. The seal member has a first contact surface, a second contact surface, and an inclined surface. The first contact surface contacts the convex section. The second contact surface contacts the panel section. The inclined surface is inclined with regard to the first contact surface and the second contact surface. A bracket has an attachment section and a pressing surface. The attachment section is attached to the panel section. The pressing surface presses the inclined surface.

13 Claims, 11 Drawing Sheets

(56) References Cited

U.S. PATENT DOCUMENTS

| | | | |
|---|---|---|---|
| 4,917,435 A * | 4/1990 | Bonnett | B62D 29/00 296/190.08 |
| 5,413,188 A | 5/1995 | Ui | |
| 6,065,799 A * | 5/2000 | Suwabe | B62D 33/0636 180/89.12 |
| 7,004,533 B2 * | 2/2006 | Arthur | B62D 25/16 296/190.08 |
| 2002/0070585 A1 * | 6/2002 | Uno | B62D 25/14 296/190.08 |
| 2005/0280286 A1 * | 12/2005 | Kelley | E02F 9/163 296/190.08 |
| 2006/0006696 A1 * | 1/2006 | Umemoto | B62D 33/0617 296/190.08 |
| 2011/0272996 A1 * | 11/2011 | Heider | B60P 1/165 298/18 |
| 2014/0292035 A1 * | 10/2014 | Doi | B62D 33/0617 296/190.09 |
| 2014/0300140 A1 * | 10/2014 | Obe | B60H 1/00378 296/190.08 |
| 2015/0000996 A1 * | 1/2015 | Nagami | E02F 9/163 180/291 |

FOREIGN PATENT DOCUMENTS

| | | |
|---|---|---|
| JP | 2008-279852 A | 11/2008 |
| JP | 2011-88547 A | 5/2011 |

* cited by examiner

CAB AND WORK VEHICLE

CROSS-REFERENCE TO RELATED APPLICATIONS

This application is a U.S. National stage application of International Application No. PCT/JP2014/059228, filed on Mar. 28, 2014.

BACKGROUND

1. Field of the Invention

The present invention relates to a cab and a work vehicle.

2. Background Information

As shown in, for example, Japanese Unexamined Patent Application Publication No. 2008-279852, a work vehicle is provided with a cab where a seat where a driver sits, an operating member, and the like are arranged. The cab has a cab body and a floor frame. The cab body is arranged on the floor frame. The floor frame supports the cab body.

SUMMARY

In a case where an upper surface of the floor frame has a convex section, it is preferable that the cab body have a concave section which is recessed upward to match the shape of the convex section. It is possible to arrange the cab body on the floor frame while avoiding interference with the convex section by arranging the convex section inside the concave section.

In this case, it is possible to have a gap between the convex section and the concave section for convenience of manufacturing. As a result, it is preferable that a seal member which seals the gap be provided. However, it is not easy to attach the seal member in the gap.

In a case where, for example, the seal member is pressed into the gap after arranging the convex section inside the concave section, a large amount of effort is necessary to change the shape of the seal member. As a result, there is a problem in that ease of assembly decreases. Alternatively, in a case where the convex section is arranged inside the concave section after the seal member is already attached to the convex section or the concave section, the seal member is worn by friction with the convex section or the concave section.

An object of the present invention is to improve ease of assembly of a cab while suppressing wear on a seal member.

A cab for a work vehicle according to one aspect of the present invention is provided with a cab body, a floor frame, a seal member, and a bracket. The cab body has a panel section. The panel section includes a concave section that is recessed facing upward. The floor frame includes a convex section and supports the cab body. The convex section has a shape that protrudes facing upward and is arranged to protrude from the concave section. The seal member seals a gap between the concave section and the convex section. The seal member has a first contact surface, a second contact surface, and an inclined surface. The first contact surface comes into contact with the convex section. The second contact surface comes into contact with the panel section. The inclined surface is inclined with regard to the first contact surface and the second contact surface. The bracket has an attachment section and a pressing surface. The attachment section is attached to the panel section. The pressing surface presses the inclined surface.

In the cab for the work vehicle according to the present aspect, the pressing surface of the bracket presses the inclined surface by the attachment section of the bracket being attached to the panel section. Due to this, the first contact surface is tightly attached to the convex section and the second contact surface is tightly attached to the panel section. Due to this, the gap between the concave section and the convex section is sealed by the seal member. Accordingly, compared with a case where the seal member is pressed into a gap, it is possible for the seal to be easily attached. In addition, it is possible to seal the gap using the seal member without attaching the seal member to the concave section or the convex section in advance. Accordingly, in the cab for the work vehicle according to the present aspect, it is possible to improve ease of assembly while suppressing wear on the seal member.

It is preferable that the seal member have a vertical sealing section. The vertical sealing section seals the gap that extends between the concave section and the convex section in the up and down direction. In this case, it is possible to improve ease of assembly while suppressing wear on the vertical sealing section.

It is preferable that the seal member have a horizontal sealing section. The horizontal sealing section seals the gap between the concave section and the convex section that extends in the left and right direction. In this case, it is possible to improve ease of assembly while suppressing wear on the horizontal sealing section.

It is preferable that the convex section have a first side surface section, a second side surface section, and an upper surface section. The first side surface section is one out of the left and right side surfaces. The second side surface section is the other out of the left and right side surfaces. The upper surface section joins the first side surface section and the second side surface section. The seal member has a first vertical sealing section, a second vertical sealing section, and a horizontal sealing section. The first vertical sealing section seals a gap between the concave section and the first side surface section. The second vertical sealing section seals a gap between the concave section and the second side surface section. The horizontal sealing section seals a gap between the concave section and the upper surface section. In this case, it is possible to improve ease of assembly while suppressing wear on the first vertical sealing section, the second vertical sealing section, and the horizontal sealing section.

It is preferable that the first vertical sealing section, the second vertical sealing section, and the horizontal sealing section be integrally formed. In this case, it is possible to further improve ease of assembly.

It is preferable that the seal member further have a first compressing surface and a second compressing surface. The first compressing surface intersects with the first contact surface and the inclined surface. The second compressing surface intersects with the second contact surface and the inclined surface. In this case, when the seal member changes shape due to the inclined surface being pressed by the bracket, the first compressing surface and the second compressing surface are compressed. As a result, the seal member is firmly and tightly attached to the convex section and the panel section. Due to this, it is possible to improve the sealing property of the seal member.

It is preferable that the angle between the inclined surface and first contact surface be 40 degrees or more and 50 degrees or less and the angle between the inclined surface and the second contact surface be 40 degrees or more and 50 degrees or less. In this case, it is possible to tightly attach the first contact surface and the second contact surface to the convex section and the panel section with less bias.

The work vehicle according to another aspect of the present invention is provided with a front frame and the cab described above. The front frame extends from the cab to the front. A portion of the front frame is arranged between the left and right side surfaces of the convex section. In this case, it is possible to avoid interference between the front frame and the cab by arranging a portion of the front frame to use a space between the left and right side surfaces of the convex section. Due to this, it is possible to arrange the cab to be lower.

It is preferable that the work vehicle be further provided with front wheels, a draw bar, and a blade. The front wheels are supported by a front section of the front frame. The draw bar is arranged below the front frame and is attached to a front section of the front frame so as to be able to swing up and down. The blade is supported by a rear section of the draw bar. In this case, the work vehicle is a so-called motor grader. In the motor grader, an operator inside the cab performs an operation while viewing the blade that is at the front. Accordingly, it is possible to improve visibility of the blade for the operator in the cab by arranging the cab in the motor grader to be lower.

According to the present invention, it is possible to improve ease of assembly of a cab while suppressing wear on a seal member.

DESCRIPTION OF EXEMPLARY EMBODIMENTS

Figure 1:
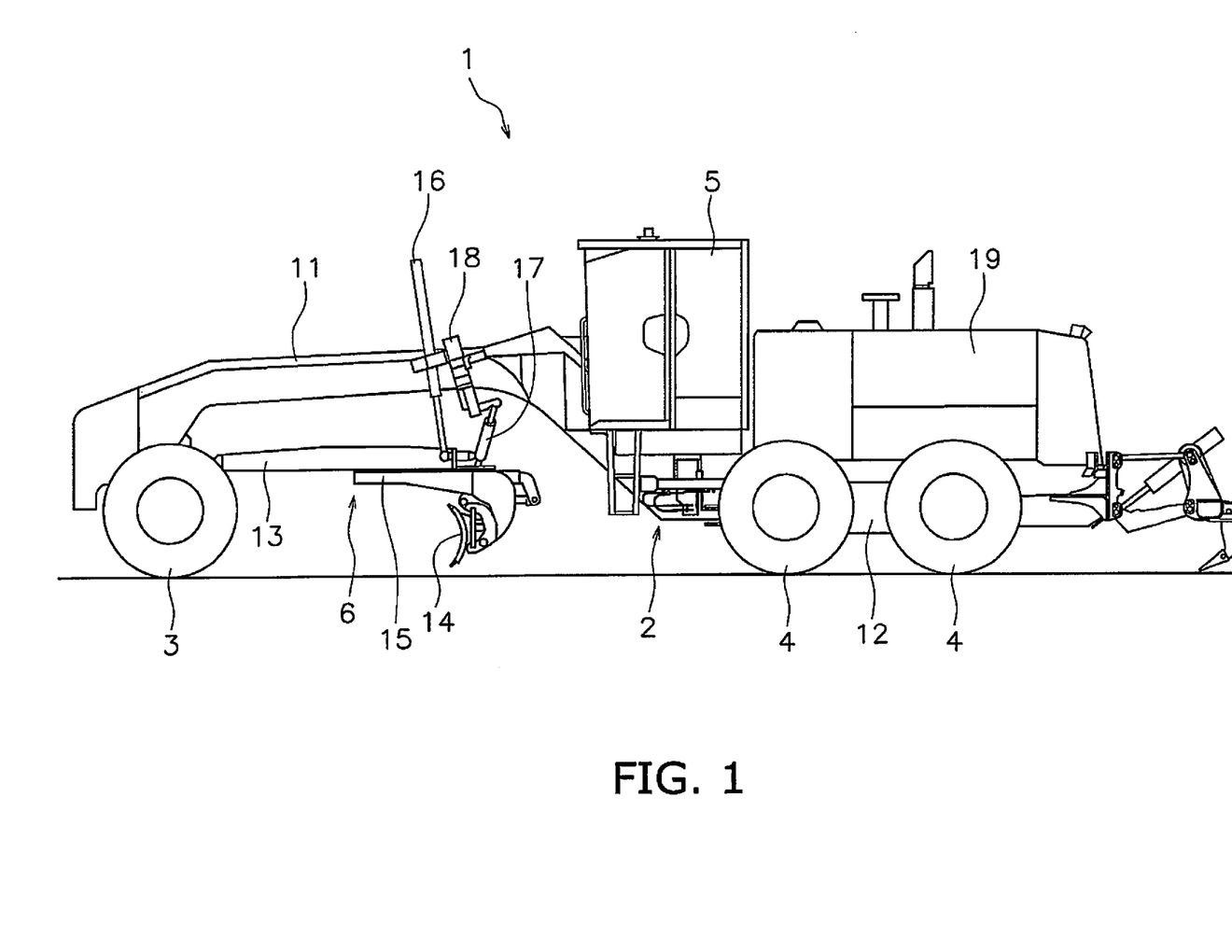
FIG. 1 is a side surface diagram of a work vehicle.

Below, a work vehicle 1 according to an exemplary embodiment will be described with reference to the diagrams. FIG. 1 is a side surface diagram illustrating an overall configuration of the work vehicle 1. In the following description, "up", "down", "left", "right", "front", and "rear" have the meaning of directions as viewed by the operator of the work vehicle 1. The work vehicle 1 is a so-called motor grader. The work vehicle 1 is provided with a frame 2, front wheels 3, rear wheels 4, a cab 5, and a work implement 6.

The frame 2 is configured by a front frame 11 and a rear frame 12. A rear end of the front frame 11 is attached to a front end of the rear frame 12 to be able to swing left and right. The rear frame 12 supports an engine room 19. The engine room 19 is arranged behind the cab 5. An engine, a hydraulic pump, and the like, which are not shown in the diagram, are arranged inside the engine room 19.

The front wheels 3 are attached to a front section of the front frame 11. The rear wheels 4 are attached to the rear frame 12. The cab 5 is arranged on the front frame 11. The front frame 11 extends from the cab 5 to the front. Alternatively, the cab 5 may be arranged on the rear frame 12.

The work implement 6 has a draw bar 13, a blade 14, a blade turning apparatus 15, a pair of lift cylinders 16, and a shift cylinder 17. The draw bar 13 is arranged below the front frame 11. The draw bar 13 is attached to a front section of the front frame 11 to be able to swing up and down. The blade 14 is supported by the rear section of the draw bar 13 via the blade turning apparatus 15. The blade turning apparatus 15 turns the blade 14. The blade turning apparatus 15 has, for example, a hydraulic motor and gears that transfer rotation of the hydraulic motor to the blade 14.

The pair of lift cylinders 16 are coupled with the front frame 11 via a lifter bracket 18. In addition, the pair of lift cylinders 16 are coupled with the draw bar 13. The blade 14 is moved up and down by the pair of lift cylinders 16 being expanded and contracted. The shift cylinder 17 is coupled with the front frame 11 via the lifter bracket 18. In addition, the shift cylinder 17 is coupled with the draw bar 13. The draw bar 13 is moved left and right by the shift cylinder 17 being expanded and contracted.

Figure 2:
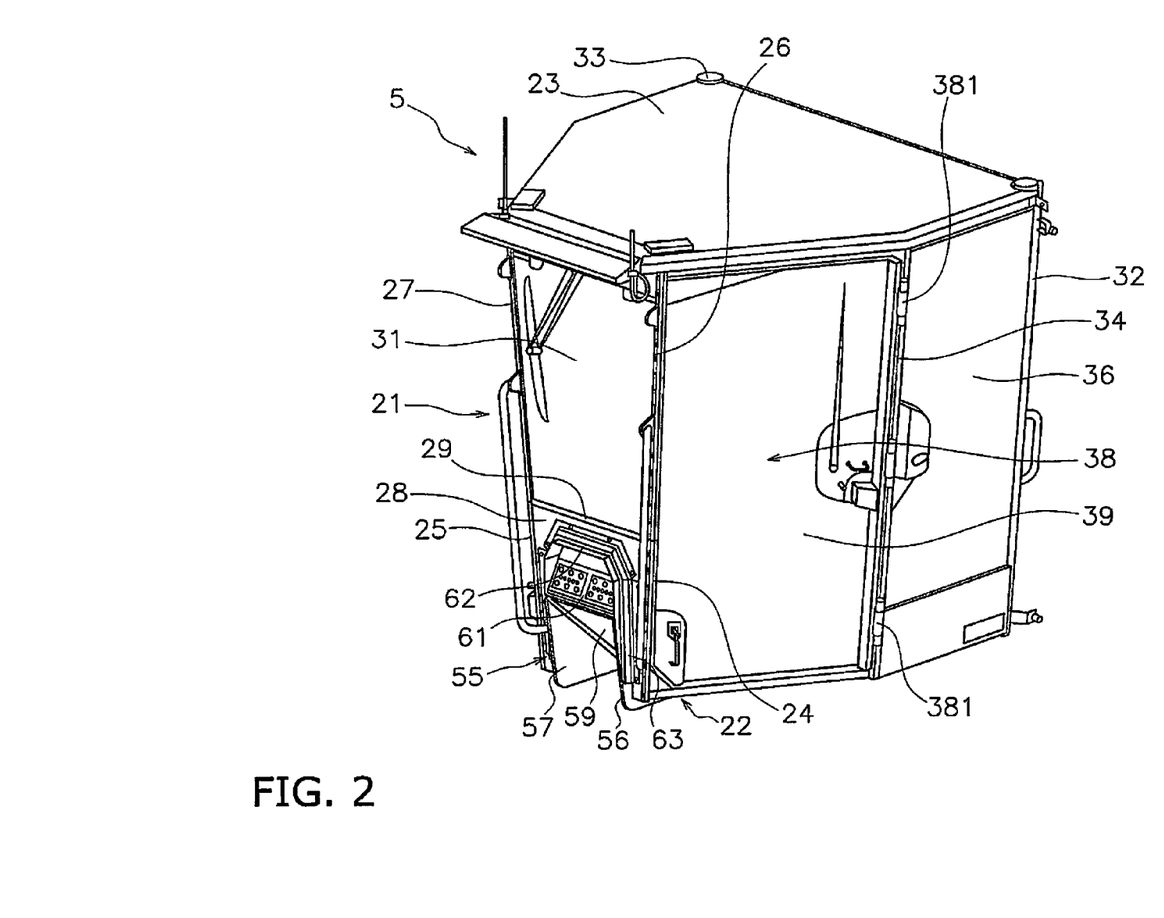
FIG. 2 is a perspective diagram of a cab.
Figure 3:
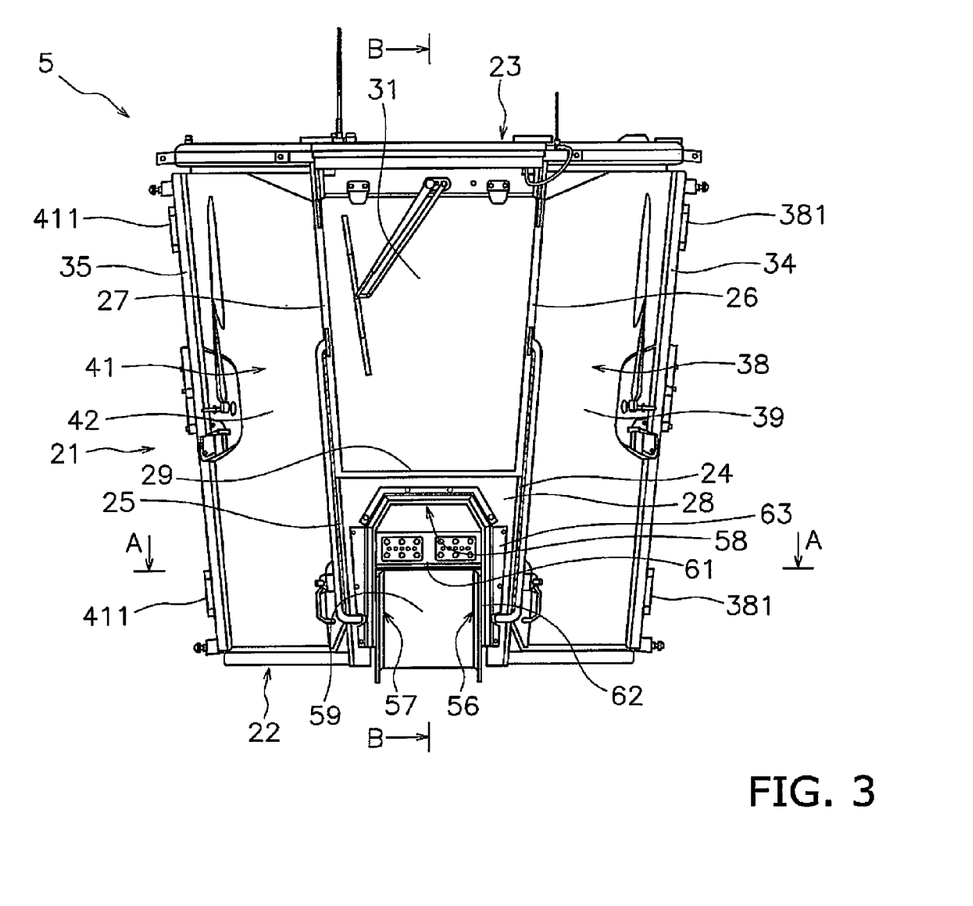
FIG. 3 is a front surface diagram of a cab.

FIG. 2 is a perspective diagram of the cab 5. FIG. 3 is a front surface diagram of the cab 5. The cab 5 has a shape of a hexagonal column. A front surface of the cab 5 has a tapered shape. As shown in FIG. 2 and FIG. 3, the cab 5 has a cab body 21 and a bottom surface section 22. The bottom surface section 22 supports the cab body 21. The cab body 21 has a ceiling section 23, a left support member 24, a right support member 25, a left front pillar 26, and a right front pillar 27.

The ceiling section 23 is arranged above the bottom surface section 22. The left support member 24 and the right support member 25 are arranged to line up in the left and right direction. The left support member 24 extends upward from a front left corner section of the bottom surface section 22. The right support member 25 extends upward from a front right corner section of the bottom surface section 22.

The left front pillar 26 and the right front pillar 27 are arranged to line up in the left and right direction. The left front pillar 26 extends downward from a front left corner section of the ceiling section 23. The left front pillar 26 is connected with an upper end section of the left support member 24. The right front pillar 27 extends downward from a front right corner section of the ceiling section 23. The right front pillar 27 is connected with an upper end section of the right support member 25.

The cab body 21 has a front panel 28 and a front panel reinforcing member 29. The front panel 28 is arranged between the left support member 24 and the right support member 25. The front panel reinforcing member 29 is arranged above the front panel 28. The front panel reinforcing member 29 extends in the left and right direction. The front panel reinforcing member 29 connects the left support member 24 and the right support member 25. The left front pillar 26 extends from a front left corner section of the ceiling section 23 to the front panel reinforcing member 29. The right front pillar 27 extends from a front right corner section of the ceiling section 23 to the front panel reinforcing member 29.

A central front window section 31 is arranged between the left front pillar 26 and the right front pillar 27. The central front window section 31 is arranged to be substantially parallel with the left and right direction. The central front window section 31 is formed of, for example, a transparent material, such as glass.

As shown in FIG. 2, the cab body 21 has a left rear pillar 32 and a right rear pillar 33. The left rear pillar 32 and the right rear pillar 33 are arranged to line up in the left and right direction. The left rear pillar 32 and the right rear pillar 33 extend in the up and down direction. The left rear pillar 32 is arranged behind the left front pillar 26. The left rear pillar 32 connects a rear left corner section of the ceiling section 23 and a rear left corner section of the bottom surface section 22. The right rear pillar 33 is arranged behind the right front pillar 27. The right rear pillar 33 connects a right rear corner section of the ceiling section 23 and a right rear corner section of the bottom surface section 22.

As shown in FIG. 3, the cab body 21 has a left side pillar 34 and a right side pillar 35. The left side pillar 34 and the right side pillar 35 are arranged to line up in the left and right direction. The left side pillar 34 and the right side pillar 35 extend in the up and down direction. The left side pillar 34 is arranged between the left front pillar 26 and the left rear pillar 32 in the front and rear direction. The left side pillar 34 connects a left side section of the ceiling section 23 and a left side section of the bottom surface section 22. The right side pillar 35 is arranged between the right front pillar 27 and the right rear pillar 33 in the front and rear direction. The right side pillar 35 connects a right side section of the ceiling section 23 and a right side section of the bottom surface section 22.

As shown in FIG. 2, a left side window section 36 is arranged between the left side pillar 34 and the left rear pillar 32. The left side window section 36 is formed of, for example, a transparent material, such as glass. The left side window section 36 is arranged substantially in parallel with the front and rear direction. Although omitted from the diagrams, a right side window section is arranged between the right side pillar 35 and the right rear pillar 33. In the same manner as the left side window section 36, the right side window section is formed of, for example, a transparent material, such as glass, and arranged substantially in parallel with the front and rear direction.

A left door section 38 is arranged between the left front pillar 26 and the left side pillar 34 and between the left support member 24 and the left side pillar 34. The left door section 38 is attached to the left side pillar 34 to be able to pivot. In detail, the left door section 38 is attached to the left side pillar 34 via a hinge 381. The left door section 38 includes a front left window section 39. The front left window section 39 is formed of, for example, a transparent material, such as glass.

As shown in FIG. 3, a right door section 41 is arranged between the right front pillar 27 and the right side pillar 35 and between the right support member 25 and the right side pillar 35. The right door section 41 is attached to the right side pillar 35 to be able to pivot. In detail, the right door section 41 is attached to the right side pillar 35 via a hinge 411. The right door section 41 includes a front right window section 42. The front right window section 42 is formed of, for example, a transparent material, such as glass.

The front left window section 39 is inclined diagonally forward to the right. The front right window section 42 is inclined diagonally forward to the left. That is, the front left window section 39 and the front right window section 42 are arranged to be inclined such that the width between the front left window section 39 and the front right window section 42 becomes narrower toward the front.

Figure 4:
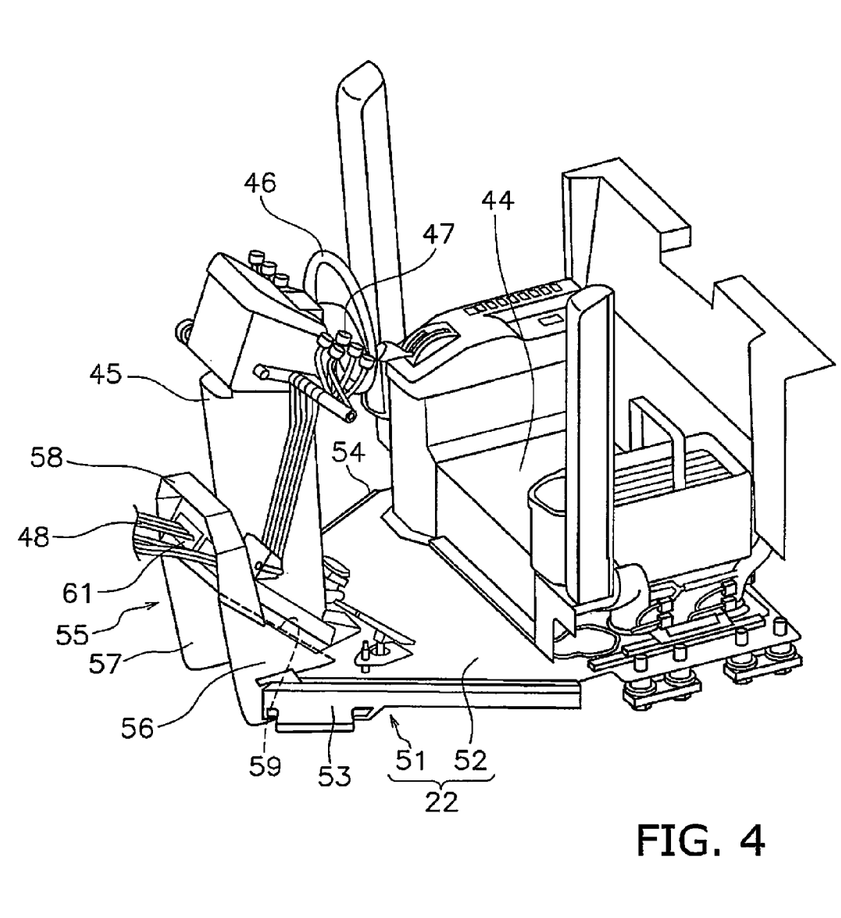
FIG. 4 is a perspective diagram illustrating a configuration inside a cab.

FIG. 4 is a perspective diagram illustrating the configuration inside the cab 5. As shown in FIG. 4, a driver's seat 44, a steering post 45, and a steering handle 46 are arranged inside the cab 5. The steering post 45 is arranged in front of the driver's seat 44. The steering handle 46 is attached to an upper section of the steering post 45.

In addition, an operation member 47 is arranged inside the cab 5. A pilot hydraulic pipe 48 is connected with the operation member 47. The reference numeral 47 is given to only one of a plurality of the operation members 47 in FIG. 4 and the reference numbers of the other operation members 47 are omitted. In addition, the reference numeral 48 is given to only one of a plurality of the pilot hydraulic pipes 48 and the reference numbers of the other pilot hydraulic pipes 48 are omitted. The operation member 47 is, for example, a lever for operating the work implement 6. The pilot hydraulic pipes 48 carry pilot hydraulic fluid for operating the work implement 6 according to operating of the operation members 47.

As shown in FIG. 4, the bottom surface section 22 has a floor frame 51 and a floor plate 52 in a top surface view. The floor frame 51 supports the floor plate 52. The floor frame 51 has a first floor frame member 53, a second floor frame member 54, and a convex section 55. The first floor frame member 53 and the second floor frame member 54 are arranged to line up in the left and right direction. The first floor frame member 53 is positioned on the left of the convex section 55. The second floor frame member 54 is positioned on the right of the convex section 55. The first floor frame member 53 and the second floor frame member 54 are arranged to be inclined such that the width between the first floor frame member 53 and the second floor frame member 54 becomes narrower toward the front. The first floor frame member 53 is positioned below the left door section 38. The second floor frame member 54 is positioned below the right door section 41.

The floor plate 52 is supported by the first floor frame member 53 and the second floor frame member 54. The driver's seat 44 is arranged on the floor plate 52.

The convex section 55 is positioned in front of the driver's seat 44. The convex section 55 is connected to a front end section of the first floor frame member 53 and a front end section of the second floor frame member 54. The convex section 55 has a shape which protrudes upward from the floor plate 52. The convex section 55 has a first side surface section 56, a second side surface section 57, an upper surface section 58, and an inclined surface 59. The first side surface section 56 is one out of the left and right side surfaces. The second side surface section 57 is the other out of the left and right side surfaces. In the present embodiment, the first side surface section 56 is the left side surface of the convex section 55. The second side surface section 57 is the right side surface of the convex section 55.

The first side surface section 56 and the second side surface section 57 are arranged to be separated in the left and right direction. A portion of the front frame 11 described above is arranged between the first side surface section 56 and the second side surface section 57 of the convex section 55. The upper surface section 58 connects the first side surface section 56 and the second side surface section 57. The inclined surface 59 is arranged behind the first side surface section 56 and the second side surface section 57. The inclined surface 59 connects the first side surface section 56 and the second side surface section 57. The inclined surface 59 is arranged below the upper surface section 58. The inclined surface 59 is inclined diagonally forward and upward.

A hydraulic pipe connecting section 61 is arranged above the inclined surface 59. The hydraulic pipe connecting section 61 is arranged between an upper end section of the inclined surface 59 and the upper surface section 58. The hydraulic pipe connecting section 61 is arranged between the first side surface section 56 and the second side surface section 57 of the convex section 55. The hydraulic pipe connecting section 61 is connected with the pilot hydraulic pipe 48.

As shown in FIG. 2 and FIG. 3, the cab 5 has a seal member 62 and a bracket 63. The seal member 62 seals a gap between the cab body 21 and the floor frame 51. The seal member 62 is made of an elastic body. The seal member 62 is, for example, made of rubber. The bracket 63 attaches the seal member 62 to the cab body 21.

Figure 5:
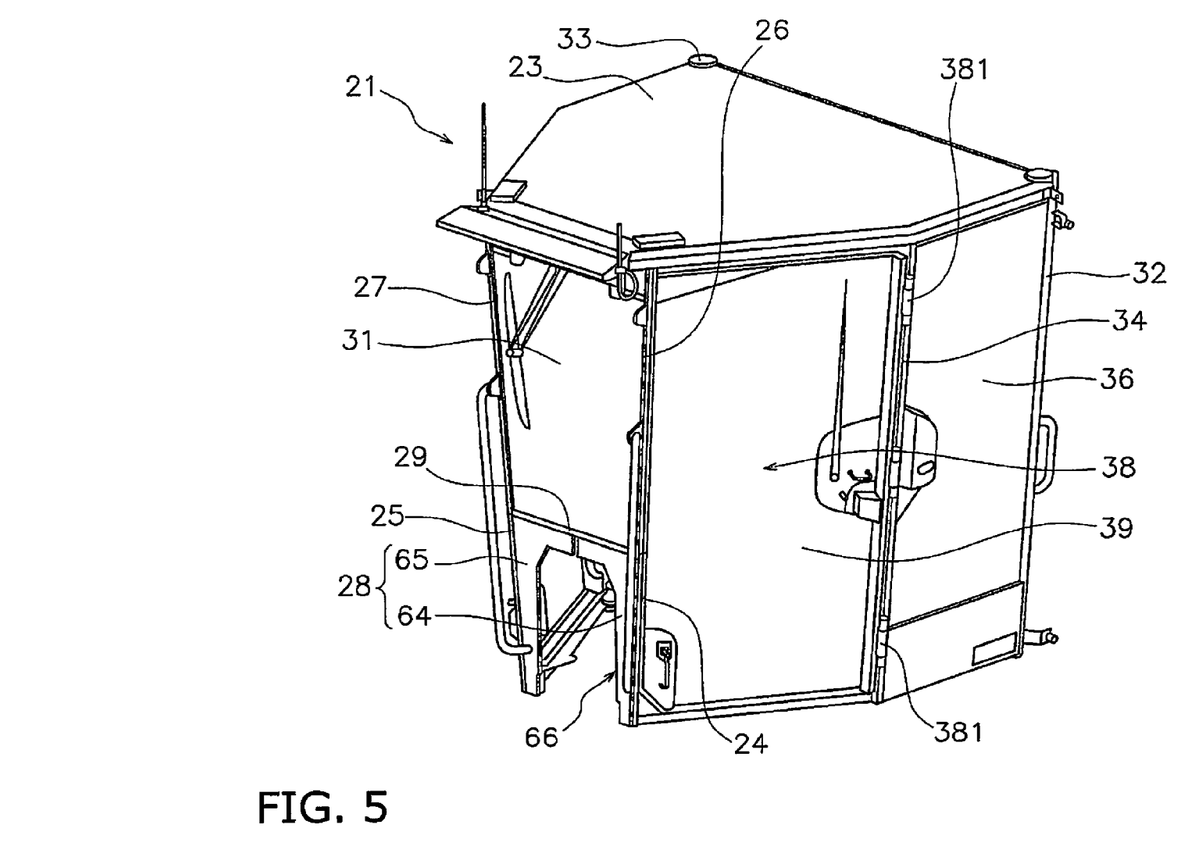
FIG. 5 is a perspective diagram of a cab body in a state where a seal member and a bracket are detached.
Figure 6:
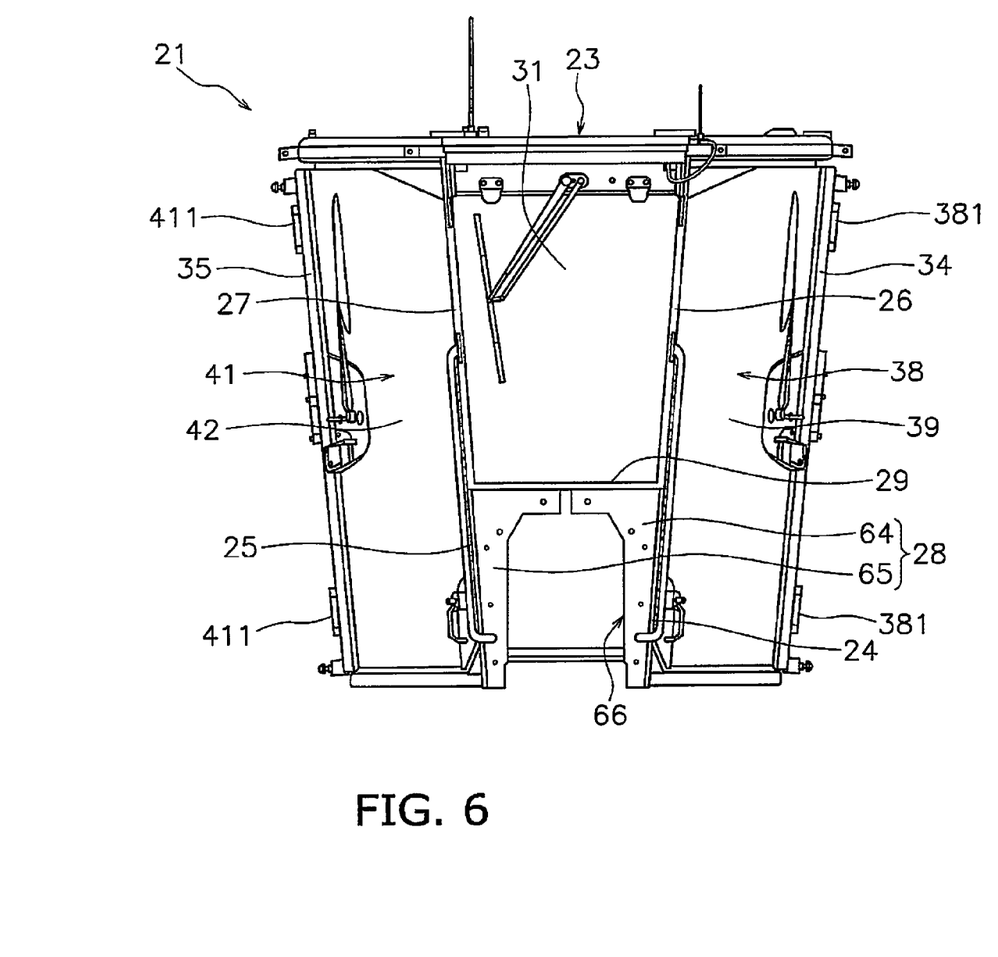
FIG. 6 is a front surface diagram of a cab body in a state where a seal member and a bracket are detached.

FIG. 5 is a perspective diagram of the cab body 21 in a state where the seal member 62 and the bracket 63 are detached. FIG. 6 is a front surface diagram of the cab body 21 in a state where the seal member 62 and the bracket 63 are detached. As shown in FIG. 5 and FIG. 6, the front panel 28 has a first panel section 64 and a second panel section 65. The first panel section 64 and the second panel section 65 are separate members. However, the first panel section 64 and the second panel section 65 may be integrated. The first panel section 64 and the second panel section 65 are arranged to line up in the left and right direction. The first panel section 64 is connected with the left support member 24. The second panel section 65 is connected with the right support member 25.

Figure 7:
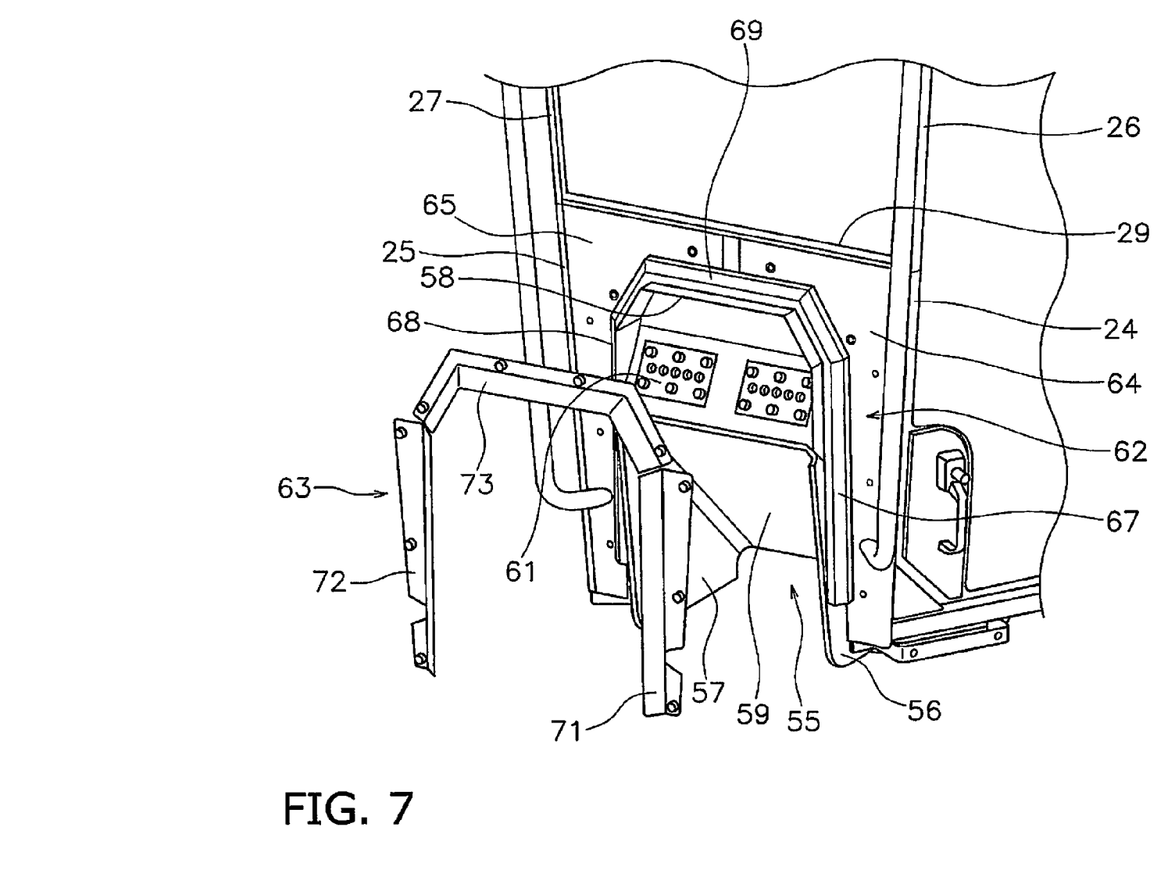
FIG. 7 is an exploded diagram illustrating a portion of the configuration of a cab.

The front panel 28 includes a concave section 66 that is recessed facing upward. The convex section 55 of the floor frame 51 described above is arranged inside the concave section 66. FIG. 7 is an exploded diagram illustrating a portion of the configuration of the cab 5. As shown in FIG. 7, the convex section 55 is arranged to protrude from the concave section 66 of the front panel 28 to the front. Accordingly, a portion of the convex section 55 is positioned in front of the concave section 66 of the front panel 28. As a result, a portion of the first side surface section 56 is positioned in front of the concave section 66. A portion of the second side surface section 57 is positioned in front of the concave section 66. A portion of the upper surface section 58 is positioned in front of the concave section 66. The seal member 62 seals a gap between the concave section 66 and the convex section 55.

Figure 8:
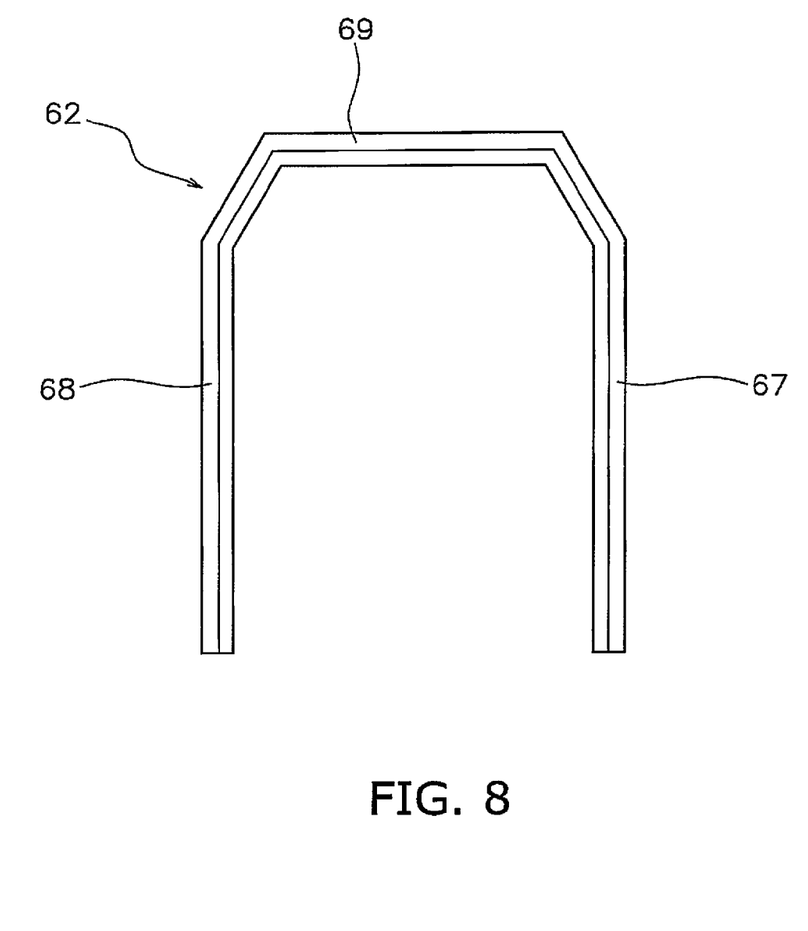
FIG. 8 is a front surface diagram of a seal member.

FIG. 8 is a front surface diagram of the seal member 62. The seal member 62 has a first vertical sealing section 67, a second vertical sealing section 68, and a horizontal sealing section 69. The first vertical sealing section 67 seals a gap that extends between the concave section 66 and the first side surface section 56 in the up and down direction. The second vertical sealing section 68 seals a gap that extends between the concave section 66 and the second side surface section 57 in the up and down direction. The horizontal sealing section 69 seals a gap that extends between the concave section 66 and the upper surface section 58 in the left and right direction. The first vertical sealing section 67 and the second vertical sealing section 68 are arranged to line up in the left and right direction. The first vertical sealing section 67 and the second vertical sealing section 68 extend in the up and down direction. The horizontal sealing section 69 extends in the left and right direction. The first vertical sealing section 67, the second vertical sealing section 68, and the horizontal sealing section 69 are integrally formed.

As shown in FIG. 7, the bracket 63 is fixed to the front panel 28 using a fixing member, such as a bolt. The bracket 63 has a first vertical bracket section 71, a second vertical bracket section 72, and a horizontal bracket section 73. The first vertical bracket section 71 and the second vertical bracket section 72 are arranged to line up in the left and right direction. The first vertical bracket section 71 and the second vertical bracket section 72 extend in the up and down direction. The horizontal bracket section 73 extends in the left and right direction. The first vertical sealing section 67, the second vertical sealing section 68, and the horizontal sealing section 69 are separate members.

The first vertical bracket section 71 contacts the first vertical sealing section 67. The first vertical bracket section 71 attaches the first vertical sealing section 67 to the front panel 28. The second vertical bracket section 72 contacts the second vertical sealing section 68. The second vertical bracket section 72 attaches the second vertical sealing section 68 to the front panel 28. The horizontal bracket section 73 contacts the horizontal sealing section 69. The horizontal bracket section 73 attaches the horizontal sealing section 69 to the front panel 28.

Figure 9:
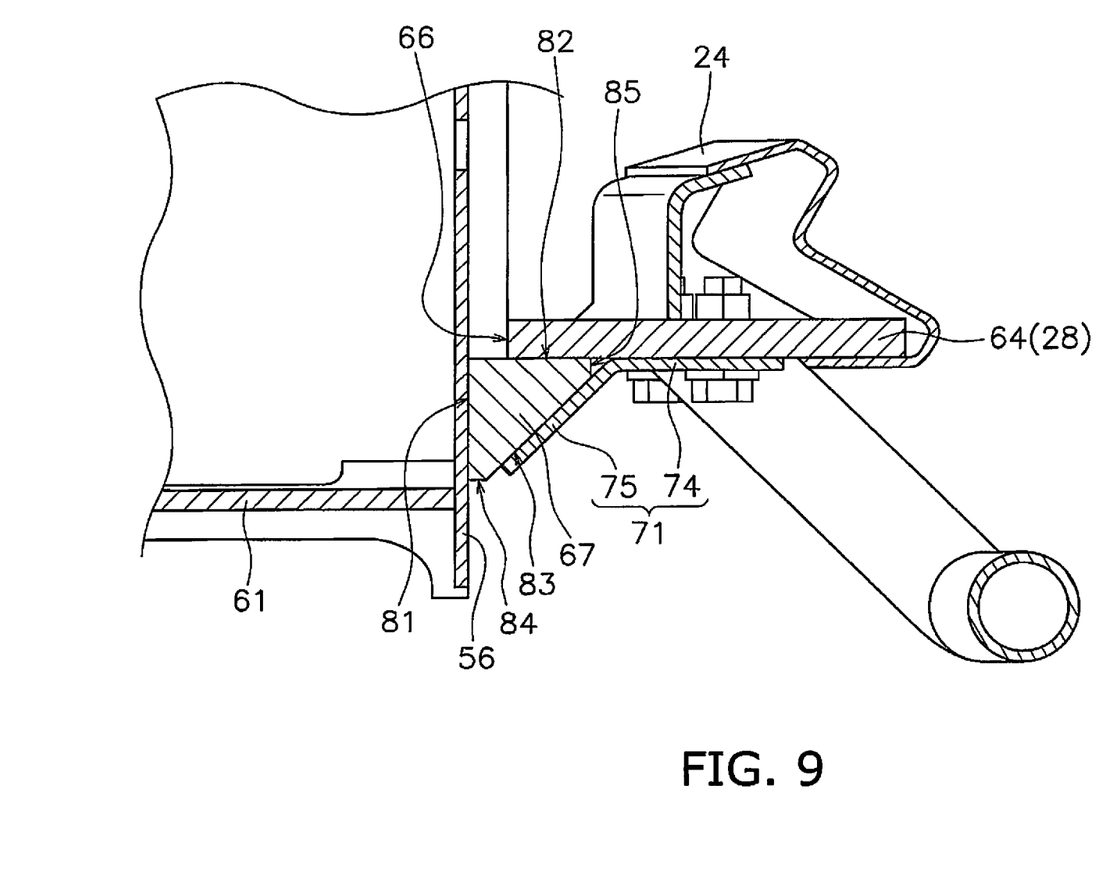
FIG. 9 is a diagram illustrating a left-side portion of a cross section A-A of the cab in FIG. 3.

FIG. 9 is a diagram illustrating a left-side portion of a cross section A-A in FIG. 3. As shown in FIG. 9, the first vertical sealing section 67 seals a gap between the concave section 66 and the first side surface section 56. The first vertical sealing section 67 has a first contact surface 81, a second contact surface 82, and an inclined surface 83. The first contact surface 81 contacts the first side surface section 56 of the convex section 55. The second contact surface 82 contacts the front panel 28. In detail, the second contact surface 82 contacts the first panel section 64. The inclined surface 83 is inclined with regard to the first contact surface 81 and the second contact surface 82.

The first vertical bracket section 71 has an attachment section 74 and a pressing surface 75. The attachment section 74 is attached to the front panel 28. In detail, the attachment section 74 of the first vertical bracket section 71 is attached to the first panel section 64. The pressing surface 75 is inclined with regard to the attachment section 74. The pressing surface 75 presses the inclined surface 83. The angle between the inclined surface 83 and the first contact surface 81 is 40 degrees or more and 50 degrees or less, and is preferably 45 degrees. The angle between the inclined surface 83 and the second contact surface 82 is 40 degrees or more and 50 degrees or less, and is preferably 45 degrees. Due to this, the first contact surface 81 is pressed toward the first side surface section 56 of the convex section 55. In addition, the second contact surface 82 is pressed toward the front panel 28.

The first vertical sealing section 67 further has a first compressing surface 84 and a second compressing surface 85. The first compressing surface 84 intersects with the first contact surface 81 and the inclined surface 83. The first compressing surface 84 connects the first contact surface 8 and the inclined surface 83. The second compressing surface 85 intersects with the second contact surface 82 and the inclined surface 83. The second compressing surface 85 connects the second contact surface 82 and the inclined surface 83. The first compressing surface 84 and the second compressing surface 85 are a portion that is compressed by the pressing surface 75 pressing the inclined surface 83.

Figure 10:
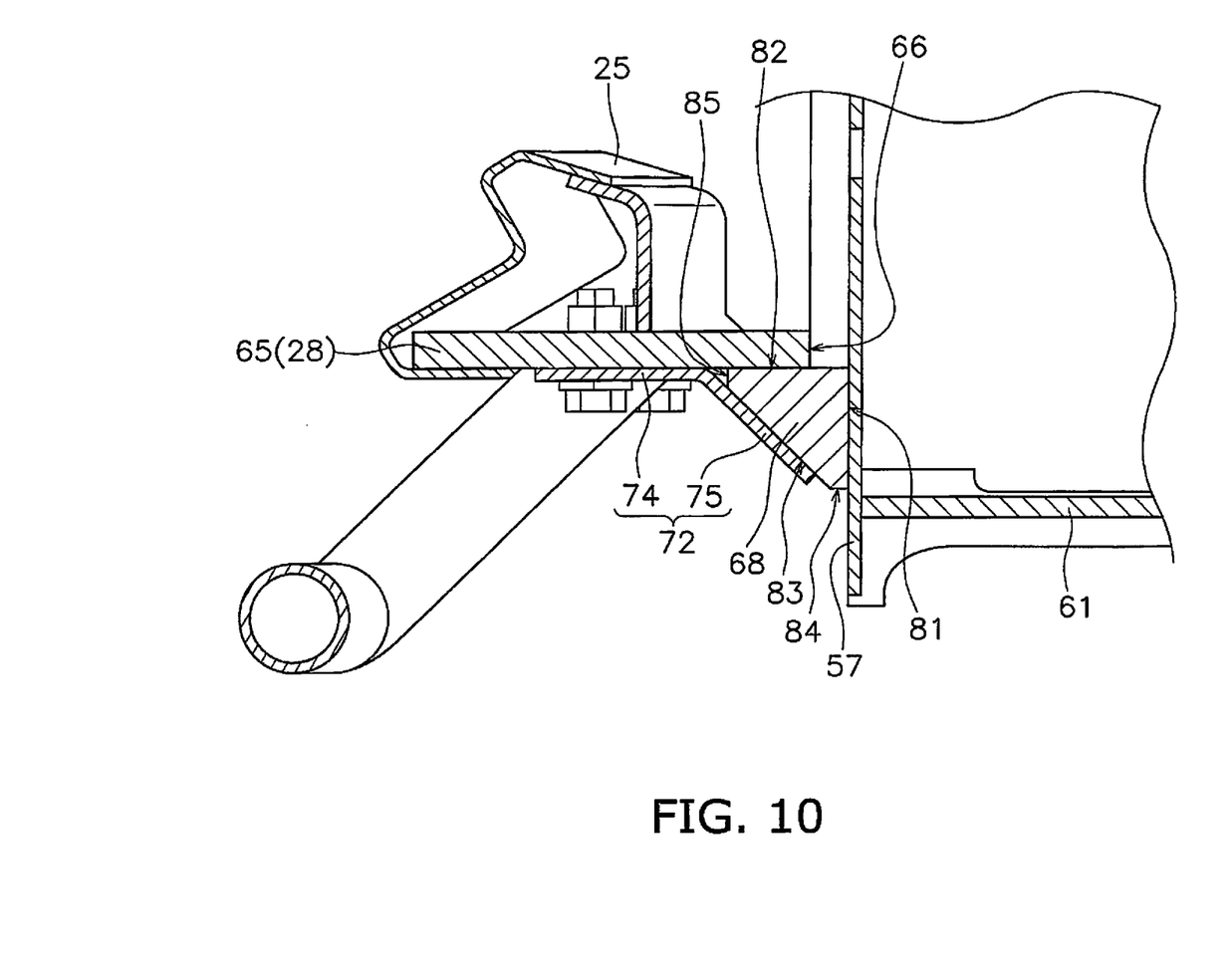
FIG. 10 is a diagram illustrating a right-side portion of the cross section A-A of the cab in FIG. 3.

FIG. 10 is a diagram illustrating a right-side portion of the cross section A-A in FIG. 3. As shown in FIG. 10, the second vertical sealing section 68 seals a gap between the concave section 66 and the second side surface section 57. The second vertical sealing section 68 has a shape that is the same as the first vertical sealing section 67. The second vertical bracket section 72 is attached to the second panel section 65. The second vertical bracket section 72 has a shape which is the same as the first vertical bracket section 71. As a result, detailed description of the second vertical sealing section 68 and the second vertical bracket section 72 are omitted. Here, the same reference numerals are given to each of the sections of the second vertical sealing section 68 in FIG. 10 as to each of the corresponding sections of the first vertical sealing section 67. In addition, the same reference numerals are given to each of the sections of the second vertical bracket section 72 in FIG. 10 as to each of the corresponding sections of the first vertical bracket section 71.

Figure 11:
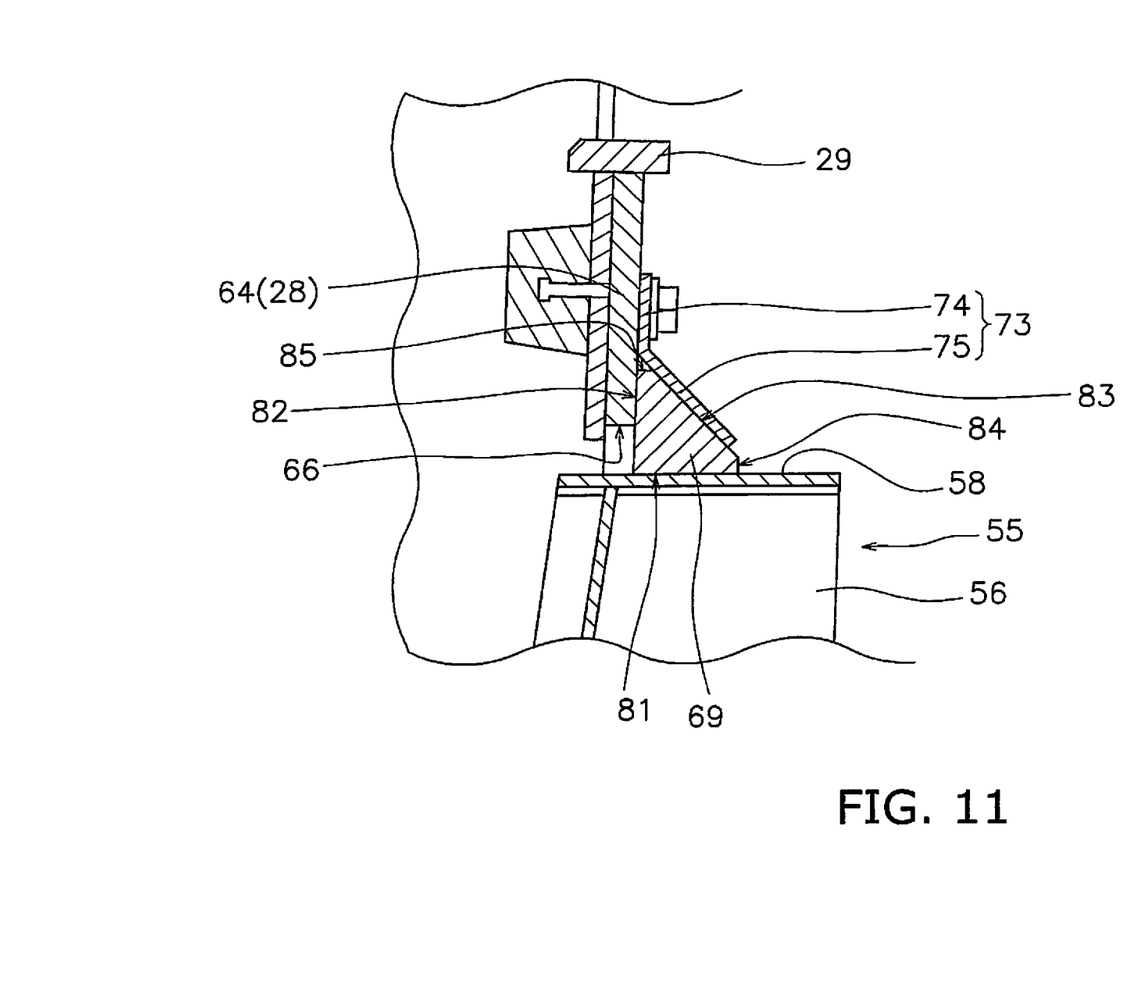
FIG. 11 is a diagram illustrating a portion of a cross section B-B of the cab in FIG. 3.

FIG. 11 is a diagram illustrating a portion of a cross section B-B in FIG. 3. As shown in FIG. 11, the horizontal sealing section 69 seals a gap between the concave section 66 and the upper surface section 58. The cross section of the horizontal sealing section 69 has a shape that is the same as the cross section of the first vertical sealing section 67 and the second vertical sealing section 68. The horizontal bracket section 73 is attached to the first panel section 64 and the second panel section 65. The cross section of the horizontal bracket section 73 has a shape that is the same as the cross section of the first vertical bracket section 71 and the second vertical bracket section 72. As a result, detailed description of the horizontal sealing section 69 and the horizontal bracket section 73 are omitted. The same reference numerals are given to each of the sections of the horizontal sealing section 69 in FIG. 11 as to each of the corresponding sections of the first vertical sealing section 67. In addition, the same reference numerals are given to each of the corresponding sections of the horizontal bracket section 73 in FIG. 11 as to each of the sections of the first vertical bracket section 71.

Next, a method for attaching the seal member 62 is described. First, the seal member 62 is attached to the front panel 28 from the front in a state where the convex section 55 is arranged inside the concave section 66. Next, the bracket 63 is arranged to cover the seal member 62 from the front. Then, the bracket 63 is attached to the front panel 28 using a fixing member, such as a bolt. Due to this, the pressing surface 75 of the bracket 63 presses the inclined surface 83 of the seal member 62. Accordingly, the first contact surface 81 of the seal member 62 is tightly attached by being pressed to the convex section 55 and the second contact surface 82 of the seal member 62 is tightly attached by being pressed to the front panel 28. Due to this, the gap between the concave section 66 and the convex section 55 is sealed by the seal member 62.

In detail, the first contact surface 81 of the first vertical sealing section 67 is tightly attached to the first side surface section 56 of the convex section 55 and the second contact surface 82 of the first vertical sealing section 67 is tightly attached to the front panel 28. Due to this, the first vertical sealing section 67 seals the gap between the concave section 66 and the first side surface section 56 by covering the gap from the front. In addition, the first contact surface 81 of the second vertical sealing section 68 is tightly attached to the second side surface section 57 of the convex section 55 and the second contact surface 82 of the second vertical sealing section 68 is tightly attached to the front panel 28. Due to this, the second vertical sealing section 68 seals the gap between the concave section 66 and the second side surface section 57 by covering the gap from the front. The first contact surface 81 of the horizontal sealing section 69 is tightly attached to the upper surface section 58 of the convex section 55 and the second contact surface 82 of the horizontal sealing section 69 is tightly attached to the front panel 28. Due to this, the horizontal sealing section 69 seals the gap between the concave section 66 and the upper surface section 58 by covering the gap from the front.

As described above, it is possible to attach the seal member 62 in a state where the convex section 55 is arranged inside the concave section 66 in the work vehicle 1 according to the present exemplary embodiment instead of attaching the seal member 62 in advance to the concave section 66 or the convex section 55. In addition, the gap is sealed by tightly attaching the seal member 62 to the convex section 55 and the front panel 28 from the outside of the gap instead of pressing the seal member 62 into the gap. As a result, it is possible to improve ease of assembly of the cab 5 while suppressing wear on the seal member 62.

The first vertical sealing section 67, the second vertical sealing section 68, and the horizontal sealing section 69 are integrally formed. As a result, it is possible to further improve ease of assembly of the cab 5.

When the seal member 62 changes shape due to the inclined surface 83 being pressed by the bracket 63, the first compressing surface 84 and the second compressing surface 85 are compressed. As a result, the seal member 62 is firmly and tightly attached to the convex section 55 and the front panel 28. Due to this, it is possible to improve the sealing property of the seal member 62.

The angle between the inclined surface 83 and the first contact surface 81 is 40 degrees or more and 50 degrees or less, and the angle between the inclined surface 83 and the second contact surface 82 is 40 degrees or more and 50 degrees or less. As a result, it is possible to tightly attach the first contact surface 81 and the second contact surface 82 to the convex section 55 and the front panel 28 with less bias.

The hydraulic pipe connecting section 61 is arranged between the first side surface section 56 and the second side surface section 57 of the convex section 55. That is, it is possible to arrange the hydraulic pipe connecting section 61 using the space between the first side surface section 56 and the second side surface section 57 of the convex section 55.

A portion of the front frame 11 is arranged between the first side surface section 56 and the second side surface section 57 of the convex section 55. That is, it is possible to avoid interference between the front frame 11 and the cab 5 by arranging a portion of the front frame 11 using the space between the first side surface section 56 and the second side surface section 57 of the convex section 55. Due to this, it is possible to arrange the cab 5 to be lower.

In particular, the work vehicle 1 according to the present exemplary embodiment is a motor grader and an operator inside the cab 5 in the motor grader performs an operation while viewing the blade 14 that is at the front. Accordingly, it is possible to improve the visibility of the blade for the operator in the cab 5 by arranging the cab 5 in the motor grader to be lower.

Above, an exemplary embodiment of the present invention is described, but the present invention is not limited to the embodiment described above and various modifications are possible in a scope which does not depart from the gist of the invention.

The work vehicle is not limited to a motor grader and may be another type of work vehicle, such as a bulldozer or a wheel loader.

The shape of the cab is not limited to the shape in the exemplary embodiment described above and may be changed. The cab is not limited to the shape of a hexagonal column and may, for example, have a cubic or rectangular shape. Alternatively, the outer shape of the cab may be configured by a curved surface. The convex section and the concave section are not limited to being at the front surface of the cab and may be provided on the rear surface or a side surface.

The shape of the seal member is not limited to the shape in the exemplary embodiment described above and may be changed. The first vertical sealing section, the second vertical sealing section, and the horizontal sealing section may be separate members. One or both of the first compressing surface and the second compressing surface may be omitted. The angle between the inclined surface and the first contact surface may be smaller than 40 degrees or may be greater than 50 degrees. The angle between the inclined surface and the second contact surface may be smaller than 40 degrees or may be greater than 50 degrees. The seal member is not limited to being an elastic body and may be formed of another material.

The shape of the bracket is not limited to the shape in the exemplary embodiment described above and may be changed. The first vertical bracket section, the second vertical bracket section, and the horizontal bracket section may be integrally formed.

An operation member 47 may be a motorized operation member without being limited to a hydraulic member. The operation member 47 is not limited to being attached to the steering post 45 and may be attached to another member. The operation member 47 may be arranged, for example, to the side of the driver's seat 44.

According to the present invention, it is possible to improve ease of assembly of a cab for a work vehicle while suppressing wear on a seal member.

The invention claimed is:

1. A cab for a work vehicle comprising:
   a cab body having a panel section, the panel section including a concave section recessed upward;
   a floor frame including a convex section having an upwardly protruding shape, the convex section being arranged to protrude from the concave section, the floor frame supporting the cab body;
   a seal member having a first contact surface contacting the convex section, a second contact surface contacting the panel section, and an inclined surface inclined with regard to the first contact surface and the second contact surface, the seal member being configured to seal a gap between the concave section and the convex section; and
   a bracket having an attachment section attached to the panel section and a pressing surface configured to press the inclined surface.

2. The cab for a work vehicle according to claim 1,
   wherein the seal member has a vertical sealing section configured to seal a gap, the gap extending between the concave section and the convex section in the up and down direction.

3. The cab for a work vehicle according to claim 1,
   wherein the seal member has a horizontal sealing section configured to seal a gap extending between the concave section and the convex section in the left and right direction.

4. The cab for a work vehicle according to claim 1,
   wherein the convex section has
   a first side surface section which is one of left and right side surfaces,
   a second side surface section which is the other of the left and right side surfaces, and
   an upper surface section joining the first side surface section and the second side surface section, and
   the seal member has
   a first vertical sealing section configured to seal a gap between the concave section and the first side surface section,
   a second vertical sealing section configured to seal a gap between the concave section and the second side surface section, and
   the horizontal sealing section configured to seal a gap between the concave section and the upper surface section.

5. The cab for a work vehicle according to claim 4,
   wherein the first vertical sealing section, the second vertical sealing section, and the horizontal sealing section are integrally formed.

6. The cab for a work vehicle according to claim 1,
   wherein the seal member has a first compressing surface arranged to intersect with the first contact surface and the inclined surface, and a second compressing surface arranged to intersect with the second contact surface and the inclined surface.

7. The cab for a work vehicle according to claim 1,
   wherein a first angle between the inclined surface and the first contact surface is between 40 degrees or more and 50 degrees or less, and
   a second angle between the inclined surface and the second contact surface is between 40 degrees or more and 50 degrees or less.

8. A work vehicle comprising:
   the cab according to claim 1; and
   a front frame extending forward from the cab,
   wherein a portion of the front frame is arranged between left and right side surfaces of the convex section.

9. The work vehicle according to claim 8, further comprising
   a front wheel supported by a front section of the front frame;
   a draw bar arranged below the front frame, the draw bar being attached to the front section of the front frame to be able to swing up and down; and
   a blade supported by a rear section of the draw bar.

10. A work vehicle comprising:
    the cab according to claim 5; and
    a front frame extending forward from the cab,
    wherein a portion of the front frame is arranged between the left and right side surfaces of the convex section.

11. The work vehicle according to claim 10, further comprising
    a front wheel supported by a front section of the front frame;
    a draw bar arranged below the front frame, the draw bar being attached to the front section of the front frame to be able to swing up and down; and
    a blade supported by a rear section of the draw bar.

12. A work vehicle comprising:
    the cab according to claim 7; and
    a front frame extending forward from the cab,
    wherein a portion of the front frame is arranged between left and right side surfaces of the convex section.

13. The work vehicle according to claim 12, further comprising
    a front wheel supported by a front section of the front frame;
    a draw bar arranged below the front frame, the draw bar being attached to the front section of the front frame to be able to swing up and down; and
    a blade supported by a rear section of the draw bar.

* * * * *